Patented Feb. 23, 1937

2,071,482

UNITED STATES PATENT OFFICE 2,071,482

ANTIFREEZE

Carl Winning, Elizabeth, and John B. Holtzclaw, Roselle, N. J., assignors to Standard Oil Development Company, a corporation of Delaware No Drawing. Application January 31, 1934
Serial No. 709,114

2 Claims. (Cl. 252—5)

This invention relates to anti-freeze compositions adapted to be used in radiators of automobiles, particularly compositions having both non-corrosive and anti-freezing properties.

In the operation of automotive vehicles, particularly in the winter time, it is necessary, when using those employing water cooling systems, to choose as a cooling medium a liquid that will not freeze under the conditions of operation. Various anti-freeze compositions are used, for example, alcohol, glycerine, ethylene glycol, their aqueous solutions, and aqueous solutions of organic salts such as calcium chloride. It is also well known that these liquids are more or less corrosive and also tend to leak (or creep), which features are undesirable.

An object of the present invention is to provide a composition of matter which not only has a low freezing point but likewise will not corrode the radiators, will not creep as solutions of glycerine or ethylene glycol tend to do, and also will not cause radiator plugging.

According to this invention, a composition of the following formula is provided:

| | | |
|---|---|---|
| Glycerine | parts by volume | 85 |
| Water | do | 14 |
| Isopropyl alcohol | do | 1 |
| Urea | gs./gal | 4.0 |
| Flaxseed | gs./gal | 5.0 |
| Tertiary butyl phenol | gs./gal | 4.0 |
| Sodium carbonate (anhydrous) | gs./gal | 1.0 |
| Para-dimethylaminobenzylidenrhodamine | gs./gal | 0.1 |

Glycerine, owing to its low freezing and high boiling points, is preferred as the main ingredient for this composition. Another advantage in using glycerine is that even at the low temperatures at which it solidifies, it will not exert enough pressure to crack the radiator or engine block. The disadvantage of using glycerine is that it tends to creep at quite a rapid rate through crevices that are tight or nearly tight to water and alcohol. Not only does the creepage result in loss of anti-freeze composition but the glycerine is sprayed about the interior of the automobile producing a sticky coating. Should the leakage occur inwardly piston valves and other engine parts may be frozen tight thus necessitating costly repairs.

A number of ingredients were found whose addition to the anti-freeze will reduce leakage, for example, linseed meal, gum gambier, tragacanth, quince seed, Irish moss and their mixtures. Other well dispersed solids may be included such as paper pulp, aluminum bronze, etc., but in general flaxseed meal is preferred because of the superior results obtained and its clean appearance. The flaxseed meal is prepared by grinding flaxseed and is preferably passed through a 40 mesh screen to eliminate all the hulls. The sifted flaxseed, when used in the anti-freeze composition, takes on a translucent appearance and will not cause stoppage in the circulation of the cooling liquid.

Corrosion inhibitors are also incorporated in the anti-freeze composition to lessen its attack on metals found in the cooling system. The average automotive cooling system may contain such diverse metals as iron, copper, aluminum, lead and zinc, and we have found that a mixture of inhibitors is best suited to give adequate protection of all of these. A combination of phenols and amides plus sufficient alkali to make the anti-freeze slightly alkaline is recommended. Of particular value are tertiary butyl phenol and urea. These are most readily introduced by first dissolving them in an alcohol. To render the composition slightly alkaline, preferably to a pH value of 8 to 10, (not far beyond pH 10 in any case), sodium carbonate, phosphate, or silicate are very satisfactory.

In addition, the anti-freeze composition may have dyes such as para-dimethylaminobenzylidenrhodamine, etc. and perfumes incorporated therein.

The anti-freeze composition when used is generally diluted according to the temperatures that are to be expected. For example, where temperatures of 20° F. and higher prevail a 27% aqueous solution of the anti-freeze solution is used, for 10° F. and higher a 40% solution, for 0° F. and higher a 46% solution, for −10° F. and higher a 52% solution, etc.

Having thus described the invention, it is not intended that it be limited by any of the specific examples given but it is desired to claim all inherent novelty as broadly as the prior art permits.

We claim:

1. An anti-freeze mixture for use in radiators of automobiles, comprising glycerine, alcohol, water, urea, flaxseed, tertiary butyl phenol, sodium carbonate and a dye.

2. An anti-freeze composition for use in radiators of automobiles, comprising glycerine 85 parts, water 14 parts, alcohol 1 part, in combination with urea 4 grams per gallon, flaxseed 5 grams per gallon, tertiary butyl phenol 4 grams per gallon, sodium carbonate 1 gram per gallon and a dye 0.1 of a gram per gallon.

CARL WINNING.
JOHN B. HOLTZCLAW.